US008904711B2

(12) United States Patent
Lopez et al.

(10) Patent No.: US 8,904,711 B2
(45) Date of Patent: Dec. 9, 2014

(54) ATTACHMENT DEVICE FOR ATTACHING A GLASS PANE OF A VEHICLE TO A CARRIER OF A WINDOW REGULATOR OF A VEHICLE, GLASS PANE ASSEMBLY, WINDOW REGULATOR ASSEMBLY, AND PROCESS OF ASSEMBLING AND DISASSEMBLING

(71) Applicant: Grupo Antolín-Ingeniería S.A., Burgos (ES)

(72) Inventors: Fernando Revilla Lopez, Burgos (ES); Felix Debreda de la Iglesia, Burgos (ES); David Camara Gomez, Burgos (ES)

(73) Assignee: Grupo Antolín-Ingeniería S.A., Burgos (ES)

( * ) Notice: Subject to any disclaimer, the term of this patent is extended or adjusted under 35 U.S.C. 154(b) by 0 days.

(21) Appl. No.: 13/867,820

(22) Filed: Apr. 22, 2013

(65) Prior Publication Data
US 2013/0276372 A1    Oct. 24, 2013

(30) Foreign Application Priority Data

Apr. 24, 2012 (EP) ..................................... 12382156

(51) Int. Cl.
*B60J 1/16* (2006.01)
*B60J 1/00* (2006.01)
*E05F 11/38* (2006.01)

(52) U.S. Cl.
CPC ...... *B60J 1/007* (2013.01); *B60J 1/006* (2013.01); *E05F 11/385* (2013.01); *E05F 2011/387* (2013.01); *E05Y 2900/55* (2013.01)

USPC ................... 49/372; 49/374; 49/375; 49/348; 49/349

(58) Field of Classification Search
USPC ............................. 49/372, 374, 375, 348, 349
See application file for complete search history.

(56) References Cited

U.S. PATENT DOCUMENTS

| 3,466,802 | A | * | 9/1969 | Doveinis et al. ................ 49/428 |
| 5,363,595 | A | * | 11/1994 | Wirsing .......................... 49/375 |
| 5,546,704 | A | * | 8/1996 | Maruoka ......................... 49/375 |
| 5,778,599 | A | * | 7/1998 | Saito ............................... 49/375 |
| 5,966,872 | A | * | 10/1999 | Wasek et al. ................... 49/375 |
| 6,460,296 | B1 | * | 10/2002 | Arquevaux ..................... 49/375 |
| 7,409,797 | B2 | * | 8/2008 | Pound et al. .................... 49/375 |
| 7,584,573 | B2 | * | 9/2009 | Yoshii et al. ................... 49/375 |
| 2004/0088924 | A1 | * | 5/2004 | Moser et al. .................... 49/375 |
| 2005/0160675 | A1 | * | 7/2005 | Fenelon .......................... 49/375 |
| 2007/0022665 | A1 | * | 2/2007 | Bigourden et al. ............. 49/375 |

FOREIGN PATENT DOCUMENTS

JP             06026263 A   *   2/1994 ............. E05F 11/38

* cited by examiner

*Primary Examiner* — Katherine Mitchell
*Assistant Examiner* — Marcus Menezes

(57) ABSTRACT

A device (1) for attaching a glass pane (200) to a carrier (100) of a window regulator (51) uses a holder (11) mounted in a hole (201) of the glass pane (200). The holder (11) has a first part (12) on a face of the glass pane (200) and a second part (13) on another face of the glass pane (200). The first part (12) and said second part (13) are attached to one another by a hinge (17). The holder (11) has a coupler (16) for coupling and retaining the first part (12) and the second part (13) to one another. The attachment device (1) has a flexible retainer (31).

16 Claims, 8 Drawing Sheets

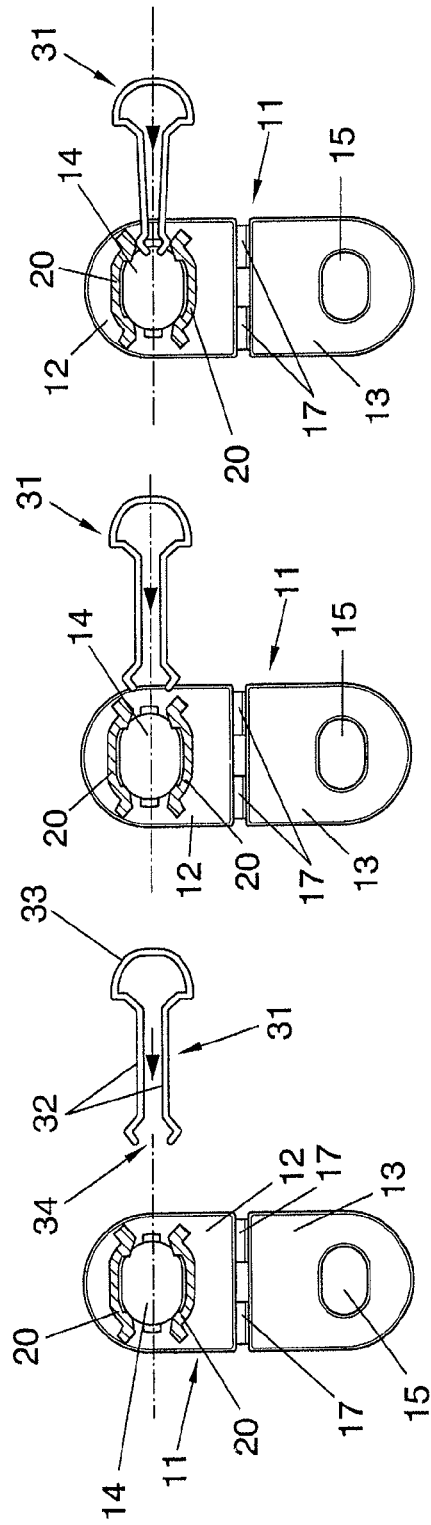
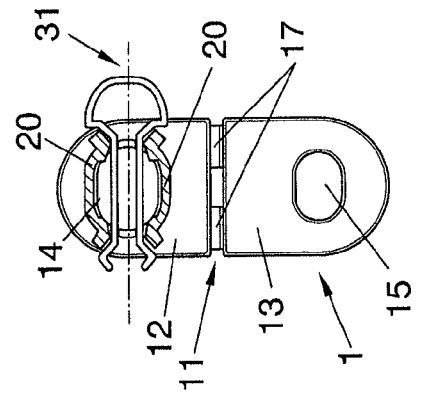
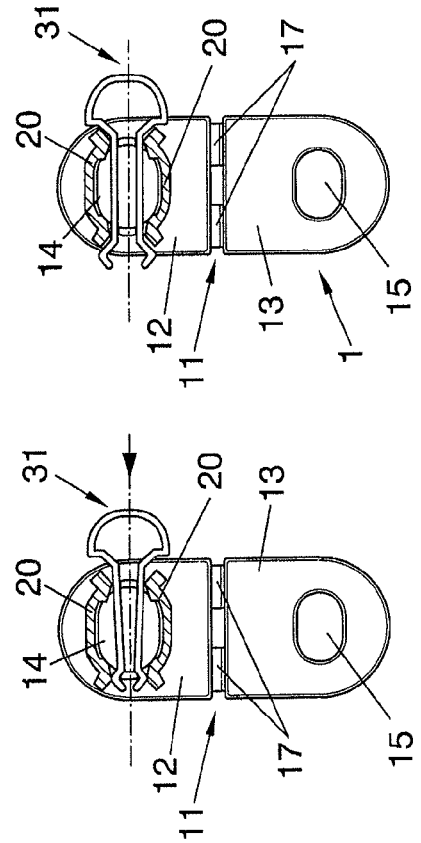
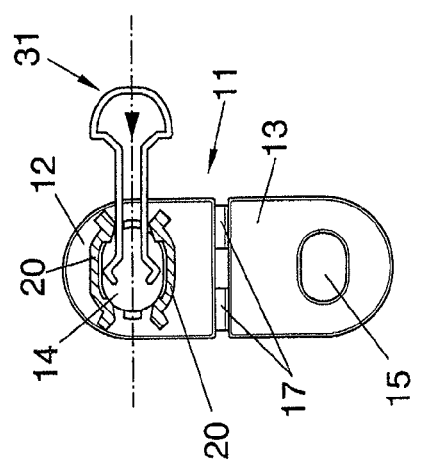
FIG. 1A  FIG. 1B  FIG. 1C
FIG. 1D  FIG. 1E  FIG. 1F

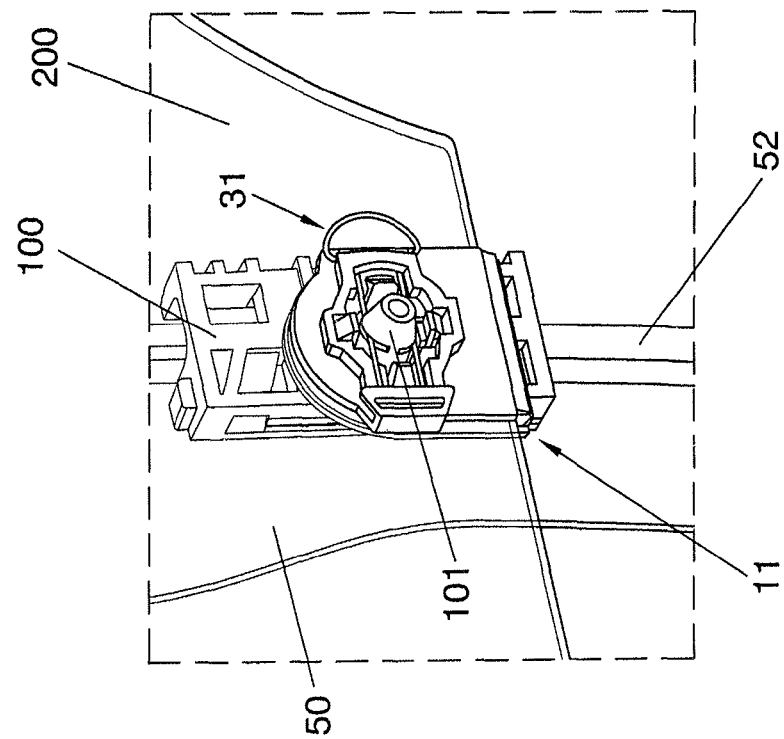
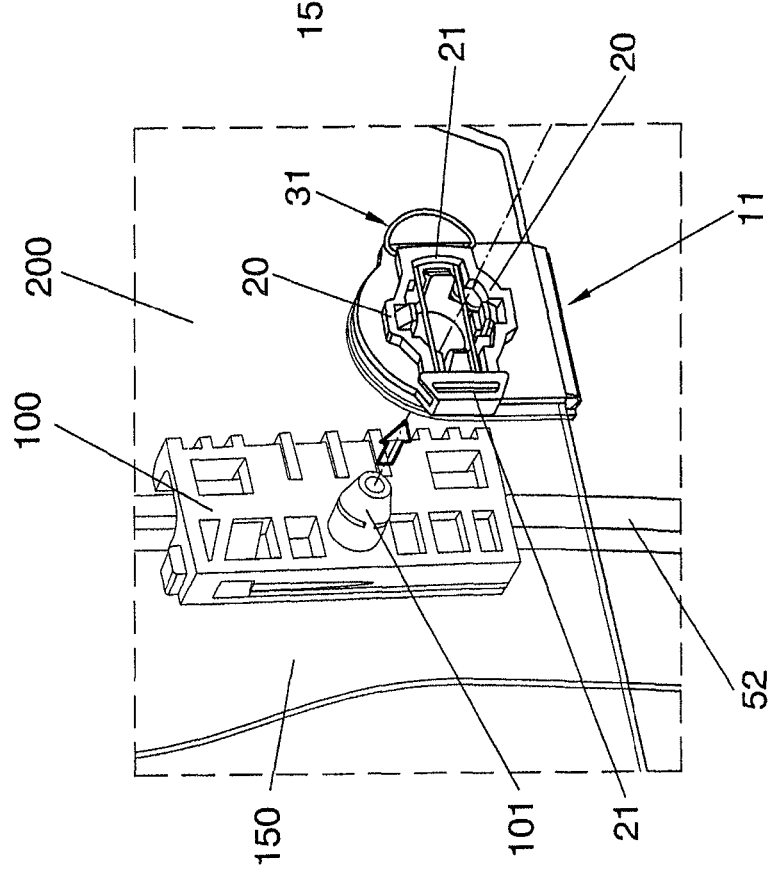
FIG. 3A
FIG. 3B

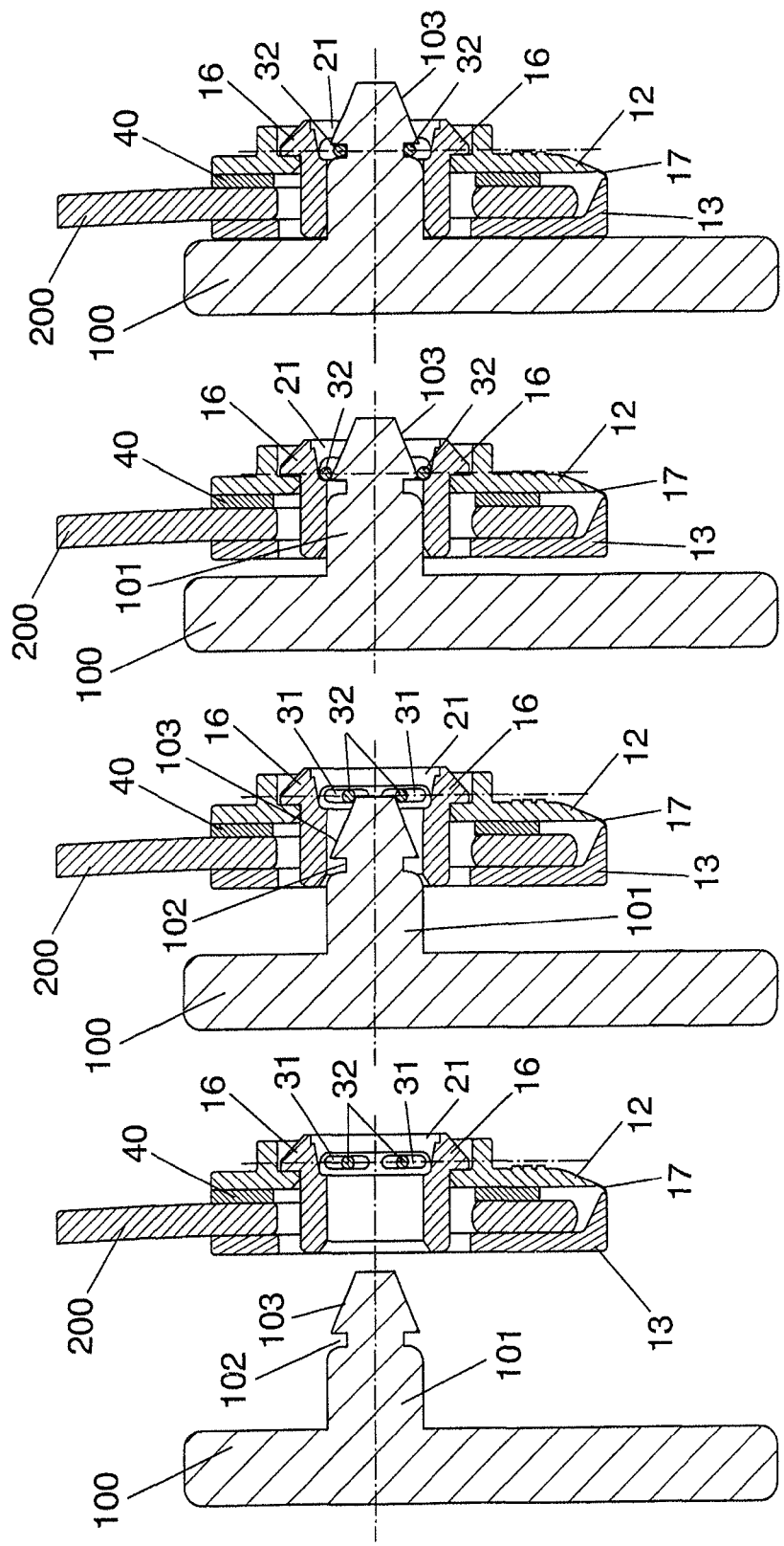

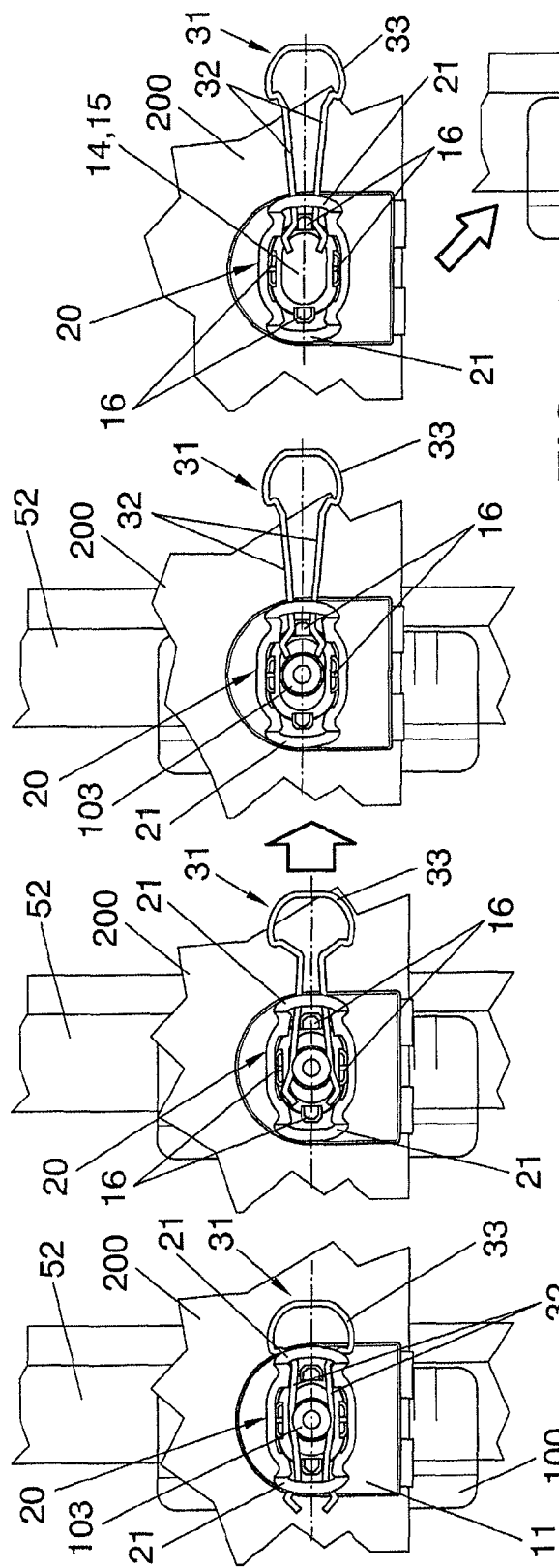

US 8,904,711 B2

ATTACHMENT DEVICE FOR ATTACHING A GLASS PANE OF A VEHICLE TO A CARRIER OF A WINDOW REGULATOR OF A VEHICLE, GLASS PANE ASSEMBLY, WINDOW REGULATOR ASSEMBLY, AND PROCESS OF ASSEMBLING AND DISASSEMBLING

TECHNICAL FIELD OF THE INVENTION

The invention is comprised in the field of window regulators for vehicles, especially cable-type window regulators. More specifically, the invention relates to the devices which are used for attaching glass panes per se to movable carriers of the window regulator.

BACKGROUND OF THE INVENTION

Window regulators including one or more carriers that are movable along corresponding rails are well known. The window regulator further comprises a manual or motor drive acting on cables transmitting the movement of the motor to the carriers. The glass pane is attached to the carriers such that it moves in accordance with the movement of the carriers.

In assembling the window regulator assembly, on one hand it is necessary to attach the glass pane to the carriers, for which purpose attachment devices especially designed for this purpose and usually fixed in holes provided in the lower part of the glass pane are used. To assemble the glass pane in the vehicle, the pre-mounted window regulator is installed in the door of the vehicle and fixed in the corresponding position. Then the glass pane is inserted through a longitudinal groove of the door until the aforementioned attachment holes of the glass pane, attachment devices and carriers of the window regulator match and can be attached to one another. Therefore, a design which enables performing this operation in a simple and reliable manner is desirable.

There is a wide range of designs for these attachment devices between glass pane and carrier. EP-A-2022921, US-A-2008/0099647, FR-A-2901300, U.S. Pat. No. 7,584, 573, DE-A-102005053446, JP-A-2004-339723 and U.S. Pat. No. 5,729,930 reflect attachment devices between a glass pane and a carrier in which said attachment is done by means of a screw or the like which, however, complicates the process of assembling and disassembling.

FR-A-2935013 describes an attachment system between a carrier and a glass pane in which an attachment device arranged on one of the faces of the glass pane is used. A protuberance associated with the carrier penetrates a hole in the attachment device and is retained in said hole by means of attachment elements forming an integral part of the attachment device.

EP-B-0844355 describes an attachment device which is also arranged on one side of the glass pane and is traversed by a lug or protuberance of the carrier. The system described in EP-B-0844355 further includes a separate element which is used to block said lug, such that the carrier is attached to the glass pane.

In both cases, and despite the fact that the attachment does not require the use of screws, they are complex structures and/or structures with multiple parts and they also complicate assembly.

Therefore, it is considered that there is a need for an alternative attachment system based on a simple structure of the attachment device and facilitating both the assembly and disassembly of the glass pane with respect to the carriers.

DESCRIPTION OF THE INVENTION

A first aspect of the invention relates to an attachment device for attaching a glass pane of a vehicle to a carrier of a window regulator of a vehicle. The device comprises a holder arranged for being mounted in a hole of the glass pane arranged for allowing the attachment of said glass pane to a carrier of a window regulator, the holder comprising a first part configured to be arranged on a face of the glass pane and a second part configured to be arranged on another face of the glass pane, said first part comprising a first hole and said second part comprising a second hole.

In accordance with the invention, said first part and said second part are attached to one another by means of at least one hinge such that the first part can pivot with respect to the second part, such that when the holder is mounted on the glass pane said first part and said second part are facing one another with the glass pane located between them, said first hole, second hole and hole of the glass pane being in correspondence with one another. Said holder further comprises coupling means for coupling and retaining said first part and said second part with one another.

The attachment device also comprises a flexible retainer coupleable to the holder in correspondence with said first hole, configured such that said flexible retainer can adopt an assembly state when it is subjected to the pressure exerted when a coupling part of the carrier of the window regulator is inserted through said first hole, second hole and hole of the glass pane, and such that the flexible retainer can adopt a retaining state for retaining said coupling part when said pressure is reduced once the flexible retainer has reached a retaining part of the coupling part. An easy coupling or snap connection is thus obtained when the flexible retainer goes from the assembly state to the retaining state. This allows coupling of glass pane to the carrier by initially simply pushing the attachment device against the carrier such that the coupling part penetrates the first hole, the second hole and the hole of the glass pane, making the flexible retainer first adopt the assembly state, to then reach the retaining state. This can be substantially less laborious than attaching a glass pane to a carrier with screws, rivets or other usual means. Furthermore, since the flexible retainer is not an integral part of the holder but a separate element that is coupleable to the holder, if the glass pane is to be removed from the carrier, the flexible retainer can be removed to cancel the retention of the coupling part. In other words, the invention allows not only an easy and rapid coupling of the glass pane to the carrier, but it also allows the glass pane to be easily removed from the carrier.

In some embodiments of the invention, the flexible retainer comprises two legs attached to one another at a first end of the flexible retainer, such that it allows certain elastic deformation such that the distance between said legs can increase giving rise to said assembly state and retaining state in accordance with the position of the coupling part with respect to the flexible retainer and the pressure exerted by the same during the process of assembling the glass pane in the carrier of the window regulator. In other words, in some embodiments of the invention the flexible retainer is a clip type retain the legs of which are separated at least locally when subjected to pressure. In some embodiments of the invention, the pressure is exerted by a bevelled head of the end of the coupling part of the carrier that is inserted between said legs in a direction perpendicular to the plane of the flexible retainer. Given that the flexible retainer is configured elastically, the legs tend to return to their initial position. Therefore in some embodiments of the invention, the assembly state corresponds to a greater distance between the legs and the retaining state corresponds to a smaller distance between the legs.

In some embodiments of the invention, the two legs are attached at one end of each leg and the other end is free, allowing pivoting of the legs or at least a local separation of the legs when subjected to pressure. In some embodiments of the invention, this is done with a U-shaped flexible retainer. In some embodiments of the invention, the flexible retainer is formed by a flexible wire, preferably a metal wire.

A reliable, easy to manufacture, easy to handle and inexpensive flexible retainer is thus achieved.

The attachment device is configured such that the flexible retainer can move with respect to the holder according to a linear movement in a direction substantially parallel to the glass pane when the holder is mounted on the glass pane, and such that the flexible retainer can be decoupled from the holder by means of the mentioned linear movement of the flexible retainer. This allows not only easy coupling of the flexible retainer to the holder but also easy decoupling and, accordingly, easily removing the glass pane from the carrier with movements of the flexible retainer substantially parallel to the plane of the glass pane.

The second part of the holder has guiding elements for guiding the flexible retainer between a retaining position in which it can retain the coupling part of the carrier of the window regulator and a releasing position which allows removing the coupling part of the attachment device, and thus releasing the glass pane with respect to the window regulator, by means of a linear movement of the flexible retainer in direction transverse to the axis of the hole of the glass pane.

At least some of the guiding elements are configured for preventing a movement of the flexible retainer in a direction parallel to the axis of the hole of the glass pane, i.e., in a direction orthogonal to the glass pane.

In some embodiments, the holder and the flexible retainer are configured such that when the first part and the second part of the holder are coupled to one another through the coupling means, the flexible retainer is retained in said holder, i.e., it cannot be separated from the holder, but is movable between its retaining position and its releasing position.

In some embodiments, the coupling means comprise at least one closing clip configured to act on an outer surface of the first part of the holder for retaining said first part against the glass pane when the holder is mounted on the glass pane. For that purpose the second part comprises one or more hooks or clips configured to act on the first part for retaining it when the holder is mounted on the glass pane. The holder can thus be locked in the glass pane without the flexible retainer intervening in said blocking.

The coupling means are configured for interacting such that they retain the first part with respect to the second part when said holder is mounted on the glass pane hole. The holder also has guiding elements of the flexible retainer such that it is retained in the holder, being movable between its retaining position and its releasing position. In a preferred embodiment, to enable removing the flexible retainer completely from the holder it is necessary to previously decouple the first part from the second part, such that the coupling means no longer retain said first part with respect to said second part; i.e., by modifying the relation between the guiding elements and the coupling means, it is possible to remove the flexible retainer from the holder. This configuration prevents the flexible retainer from being able to be involuntarily removed from the holder when the attachment device is mounted on the glass pane.

In some embodiments of the invention, the attachment device comprises at least one noise preventing part configured to be interposed either between the first part of the holder and the glass pane and/or between the second part of the holder and the glass pane when the attachment device is mounted in the glass pane hole.

In some embodiments of the invention, at least one from among its first hole and its second hole is circular such that when said attachment device is coupled with the coupling part of the carrier of the window regulator, the diameter of said circular hole corresponds with the outer diameter of the portion of the coupling part contacting it, such that it prevents relative movement between the carrier and the holder and, accordingly, between the carrier and the glass pane.

In some embodiments of the invention, at least one from among its first hole and its second hole has a minimum diameter and a maximum diameter, for example an elongated hole, such that when it is coupled with the coupling part of the carrier of the window regulator, said minimum diameter matches the outer diameter of the portion of the coupling part contacting it, allowing certain relative movement between the carrier and the holder in the direction of the larger diameter and, accordingly, between the carrier and the glass pane, allowing absorbing the path deviations of the carrier and glass pane due to manufacturing and assembly tolerances.

Another aspect of the invention relates to a glass pane assembly of a vehicle comprising the glass pane with a hole for attaching the glass pane to the carrier of a window regulator of the vehicle and an attachment device as described above. The holder of the attachment device is mounted in the glass pane hole with the first part arranged on one face of the glass pane, and the second part on another face of the glass pane, said first part and second part being coupled to one another such that the first hole, the second hole, the glass pane hole and the flexible retainer are in correspondence with one another.

Another aspect of the invention relates to a window regulator assembly comprising a glass pane, an attachment device as described above mounted in a hole of the glass pane and a window regulator all coupled to one another, said window regulator consisting of at least one rail with a carrier, driving means for moving said carrier along said rail, and a glass pane, the glass pane being coupled to the carrier of the window regulator by means of the collaboration between the attachment device and the coupling part of the carrier of the window regulator, such that the flexible retainer is in its retaining position and in its retaining state and coupled to the retaining part of said coupling part.

In some embodiments of the invention, the coupling part of the carrier has a bevelled end with bevelled surfaces to provide an easy passage of the flexible retainer to its assembly state, and the retaining part comprises at least one groove. In the case of using a flexible retainer with two legs, when the coupling part penetrates the second hole, it runs into these two legs and the bevelled surfaces of the bevel can separate the legs at least locally, the flexible retainer adopting the assembly state. Due to the presence of bevelled surfaces, this change easily occurs. Then when the coupling part continues penetrating the second hole, the legs of the flexible retainer reach the groove of the coupling part, fitting therein, retaining the coupling part. This groove is configured to prevent the involuntary change of state of the flexible retainer when it is in the retaining state, so the coupling part is secured in the attachment device and, accordingly, the carrier is attached to the glass pane while the flexible retainer is kept in its retaining position.

In some embodiments of the invention, at least the first hole or the second hole has a diameter that corresponds with the outer diameter of the coupling part preventing the relative movement between said carrier and the corresponding holder and, accordingly, between the carrier and the glass pane. Alternatively, in other embodiments of the invention, at least the first hole or the second hole is elongated, having a smaller dimension that coincides with the diameter of the coupling part and a larger dimension that is larger than the diameter of the coupling part for allowing the relative movement between the carrier and the attachment device and, accordingly, between the glass pane and the carrier in direction transverse to the forward movement of the carrier, allowing absorbing the path deviations of the carrier and glass pane due to manufacturing and assembly tolerances.

In some embodiments of the invention, the window regulator comprises two rails with two carriers, one for each rail, each of them mounted in corresponding holes of the glass pane by corresponding attachment means, such that in one of said attachment devices at least one from among its first hole and its second hole is circular with a diameter equal to the outer diameter of the coupling part of the corresponding carrier coupled therewith preventing the relative movement between the corresponding carrier and the glass pane, whereas in the other attachment device at least one from among its first hole and its second hole has a minimum diameter and a maximum diameter, said minimum diameter being equal to the outer diameter of the corresponding coupling part, allowing certain relative movement between the corresponding carrier and the glass pane, thus allowing absorbing the path deviations the carriers and glass pane due to the manufacturing and assembly tolerances.

Another aspect of the invention relates to a process of assembling a glass pane to a carrier of a window regulator as described above, comprising the steps of:

coupling a flexible retainer in a holder to configure the attachment device, coupling a first part and a second part of the holder in a hole of a glass pane such that said first part and second part are retained with one another and the glass pane located between them and such that the flexible retainer is ready in retaining position to configure a glass pane assembly, approximating the glass pane assembly to a carrier of the window regulator such that a coupling part of the carrier is introduced through the first hole, the second hole and the hole of the glass pane, pressing the flexible retainer until it reaches its assembly state, and continuing to approximate the glass pane assembly to the carrier of the window regulator until the flexible retainer reaches the retaining part of the coupling part such that said flexible retainer reaches its retaining state in which the glass pane is eventually coupled to the carrier of the window regulator, configuring the window regulator assembly.

Another aspect of the invention relates to a process of disassembling a glass pane assembly from a carrier of a window regulator of a vehicle to which it is coupled by means of at least one attachment device as described above, such that a coupling part of the carrier is retained by the flexible retainer of the attachment device, comprising the steps of:

moving the flexible retainer according to a direction transverse to the axis of the hole of the glass pane, from its retaining position in which it retains the coupling part of the carrier of the window regulator until it reaches its releasing position in which it no longer retains said coupling part, and separating the glass pane assembly from the carrier of the window regulator completely removing and releasing the coupling part from the glass pane hole.

DESCRIPTION OF THE DRAWINGS

To complement the description and for the purpose of aiding to better understand the features of the invention in accordance with a preferred practical embodiment thereof, a set of drawings is attached as an integral part of the description in which the following has been depicted with an illustrative and non-limiting character:

FIGS. 1A-1F schematically show a sequence of inserting the flexible retainer in the holder in a device according to an embodiment of the invention.

FIGS. 3A and 3B are respective perspective views depicting two different times of assembling the glass pane assembly in a carrier of a window regulator.

FIGS. 4A-4D are schematic cross-section views of the attachment device already mounted in the glass pane and of a carrier of a window regulator in correspondence with four different phases of a process of assembling the glass pane in the carrier of the window regulator.

FIGS. 5A-5D are elevational views of four different phases of a process of disassembling a glass pane from a carrier of a window regulator.

PREFERRED EMBODIMENT OF THE INVENTION

Figure 2A:
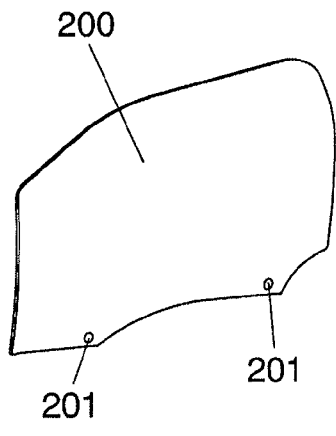
FIGS. 2A-2D schematically show a sequence of assembling an attachment device according to this embodiment of the invention in a glass pane of a vehicle.

FIG. 1A shows how the attachment device (1) comprises a holder (11). In some embodiments of the invention, the holder is made of a thermoplastic polymer which can be obtained by injection moulding. The holder comprises a first part (12) and a second part (13) which are attached to one another by means of a hinge (17) forming part of the holder (11) obtained from the same mould such that the first part (12) and the second part (13) can pivot with respect to one another about said hinge, going from a deployed or open position seen in FIGS. 1A-1F to a folded or closed assembly position, which can be seen in FIG. 2D. In other words, in FIG. 1A the holder is deployed but can be bent around the hinge (17) until the first part (12) and the second part (13) are facing one another, which position corresponds with the assembly position of the holder (11) in the corresponding hole (201) of the glass pane (200), which can be seen in FIG. 2D.

As can be seen, the first part (12) comprises a first hole (14) and the second part (13) comprises a second hole (15). In the assembly position of the attachment device (1) to the glass pane (200), these two holes face one another, both in correspondence with the hole (201) of the glass pane (200), such that a coupling part (101) of a carrier (100) of the window regulator can be inserted through these holes, as will be explained below.

Figure 2B:
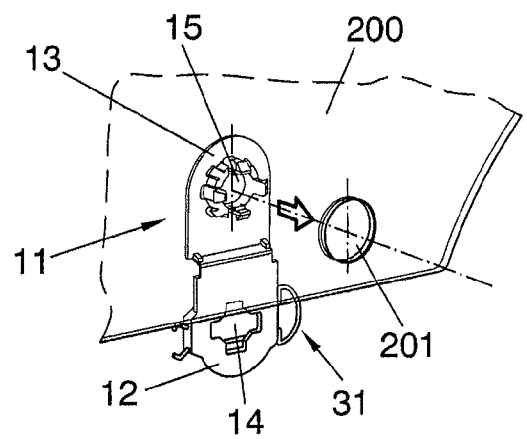
Figure 2C:
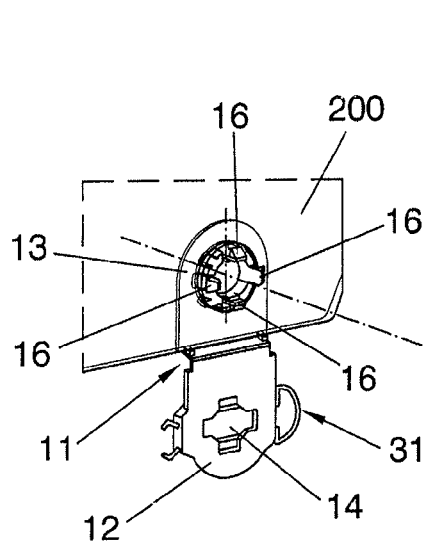
Figure 2D:
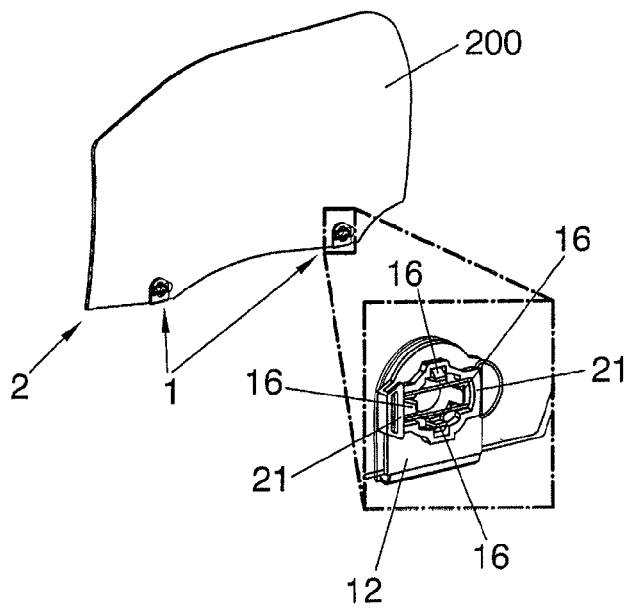
Figure 8:
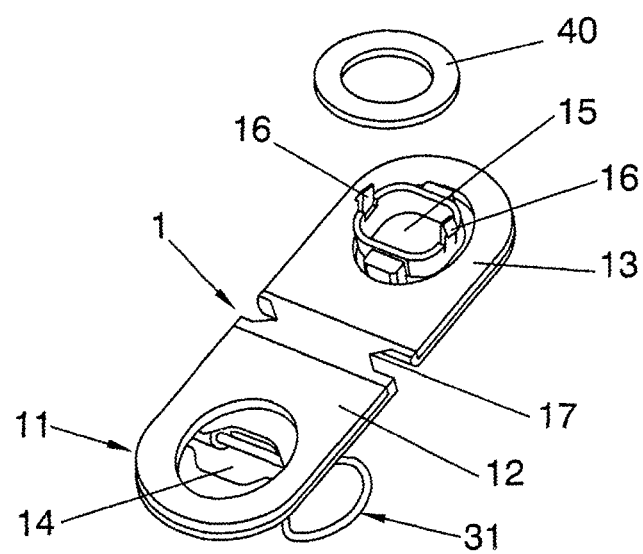
FIG. 8 is a perspective view of an attachment device in the deployed position.

The second part (13) includes in correspondence with the second hole (15), coupling means (16) in the form of a plurality of hooks or clips, see FIG. 2C and FIG. 8. The coupling means are on the hidden face of the second part in FIGS. 1A-1F. The coupling means are for retaining the first part (12) against the second part (13), for retaining both with respect to one another, once it has been mounted to the glass pane, as can be seen in FIG. 2D.

The first part is provided with guiding means (20) for a flexible retainer (31). These guiding means (20) comprise walls, ribs or bridges (21) extending outwards from the face that is farthest from the glass pane (200) in the assembly position, as seen in FIG. 4D. These guiding means extend around the first hole (14). Some of these guiding means (20) prevent the flexible retainer (31) from moving in a direction parallel to the axis of the first hole (14). In other words, they serve to prevent the flexible retainer (31) from moving away from the outer face of the first part (12) when the flexible retainer (31) is mounted in the holder (11).

On the other hand, the flexible retainer (31) is formed by a flexible metal part of a wire. The flexible retainer comprises two legs (32) attached to one another at a first end (33) of the flexible retainer (31), one end of each leg being free, allowing a tilting of the legs (32) when subjected to pressure.

FIGS. 1A-1F show the sequence of inserting the flexible retainer (31) in the holder until the position in which the flexible retainer (31) has been mounted in the holder (11), in its retaining position, i.e., in the position in which it can retain a coupling part (101) of a carrier of a window regulator. This position is stable due to the contact between the legs (32) and the guiding means (20), but it is possible to move the flexible retainer from the retaining position seen in FIG. 1F to the disassembly position seen in FIG. 1C, exerting a removal force on the flexible retainer.

FIGS. 2A-2D schematically illustrate how the attachment device (1) can be mounted in a glass pane of a vehicle, said glass pane having, close to its lower edge, a through hole (201) corresponding to said attachment device.

As can be seen in FIG. 2B, an attachment device (1) with its holder (11) and with the flexible retainer (31) already mounted approximates the hole (201) of the glass pane (200) such that, as can be seen in FIG. 2C, the coupling means (16) in the form of hooks or clips go through said hole (201) of the glass pane (200), a face of the second part (13) being placed against a face of the glass pane (200). Then the first part (12) is pivoted about the hinge (17) such that a face of the first part (12), i.e., the face seen in FIG. 2C, is placed against the opposite face of the glass pane (200) until the coupling means (16) retain the first and the second part to one another, as seen schematically in FIG. 2D, preventing them from separating one another, thereby assuring the retention of the attachment device in the hole (201) of the glass pane (200).

In this position, the first hole (14) and the second hole (15) of the holder are axially aligned with the hole (201) of the glass pane (200).

FIGS. 3A and 3B show how the glass pane (200) can be mounted to a window regulator with a carrier (100) mounted on a rail (52). The carrier (100) has a coupling part (101) in the form of a protuberance or projection with a groove (102), see FIGS. 4A-4D. For coupling the glass pane assembly formed by the glass pane (200) and the attachment device (1) to the carrier, the coupling part (101) is forced to go through the second hole (15) and the first hole (14) and the hole (201) of the glass pane (200), passing between the two legs (32) of the flexible retainer (31) until said legs fit in the groove (102).

The process of assembling the glass pane assembly in the carrier (100) is illustrated in FIGS. 4A-4D:

FIG. 4A shows how the coupling part (101) of the carrier (100) is facing the hole (201) of the glass pane (200) which is mounted to the holder, with its first part (12) and its second part (13) placed against respective faces of the glass pane (200). It shows how the coupling part (101) has its free end (103) bevelled with bevelled faces and a groove (102). On the other hand, it shows two of the clips of the coupling means (16) extending through the hole (201) of the glass pane (200) from the second part (13) engaging the first part (12), assuring the coupling of the attachment device to the glass pane (200). On the other hand, the presence of a noise preventing part (40) between one of the parts of the holder and the glass pane (200) is observed for the purpose of absorbing the tolerances between the glass pane (200) and the holder (11) which can give rise to unwanted noises or vibrations. On the other hand, two legs (32) of the flexible retainer (31) are shown in cross-section, and a bridge (21) preventing them from being able to separate from their working position according to the direction perpendicular to the glass pane can be seen.

In FIG. 4B, the bevelled surfaces of the free end (103) of the coupling part (101) contact with the legs (32) of the flexible retainer, and FIG. 4C shows how said legs (32) separate from one another elastically, leaving the coupling part (101) to go through the second hole (15) of the holder through the hole (201) of the glass pane (200), and through the first hole (14) of the holder, until the legs (32) reach the position of the groove (102), then the legs (32) approximate one another again, fitting in said groove (32), as seen in FIG. 4D. In this position, the coupling part (101) is coupled to the attachment device (1), whereby the glass pane (200) is coupled to the carrier (100).

This arrangement is advantageous not only because it allows an easy attachment between the carrier (100) and the glass pane (200), for example without using screws, but also because it helps in the process of disassembling: the flexible retainer (31) is simply removed by pulling towards the right, considering the arrangement seen in FIG. 3B, so that the attachment device can be removed from the carrier (100) and from its coupling part (101), separating the glass pane (200) from the carrier (100). The click type assembly further causes a characteristic noise produced when the legs of the holder fit into the grooves, allowing the operator non-visual control that the assembly has been performed correctly.

FIGS. 5A-5D show different times of the process of disassembling the glass pane assembly of the carrier (100). FIG. 5A shows the attachment device mounted to the glass pane (200) and on the coupling part (101) the free end (103) of which can be seen. The flexible retainer (31) is in a retaining position with the function of retaining the coupling part (101) in the attachment device (1) and, accordingly, keeping the glass pane (200) attached to the carrier (100) of the window regulator (51). It shows how the guiding means (20) serve for guiding the flexible retainer (31) such that it can be moved only linearly according to a direction transverse to the axis of the coupling part (101), and how the bridges (21) serve for preventing the flexible retainer (31) from involuntarily moving in a direction orthogonal to the outer surface of the first part of the holder (11).

For disassembly, the flexible retainer (31) is moved in the direction transverse to the axis of the coupling part (101) in the direction defined by the guiding means (20) indicated in the direction of the arrow in FIG. 5B. The ends of the guiding means (20) and the coupling means (16) are sized so as to allow the flexible retainer (31) to move, as seen in FIG. 5B, until reaching the releasing position of the flexible retainer (31), which position can be seen in FIG. 5C. In this position, the flexible retainer (31) no longer retains the coupling part (101), so the glass pane (200) with the attachment device (1) can be separated from the carrier (100) as schematically illustrated in FIG. 5D, which shows how the coupling part (101) of the carrier (100) is no longer present.

In some embodiments of the invention, the coupling means (16) and the guiding means (20) are configured so that the flexible retainer (31) cannot be removed beyond the position seen in FIG. 5D, which can be advantageous if it is to be assured that the flexible retainer (31) does not become accidentally separated from the holder (11), whereas the holder (11) is mounted on the glass pane (200).

Figure 6:
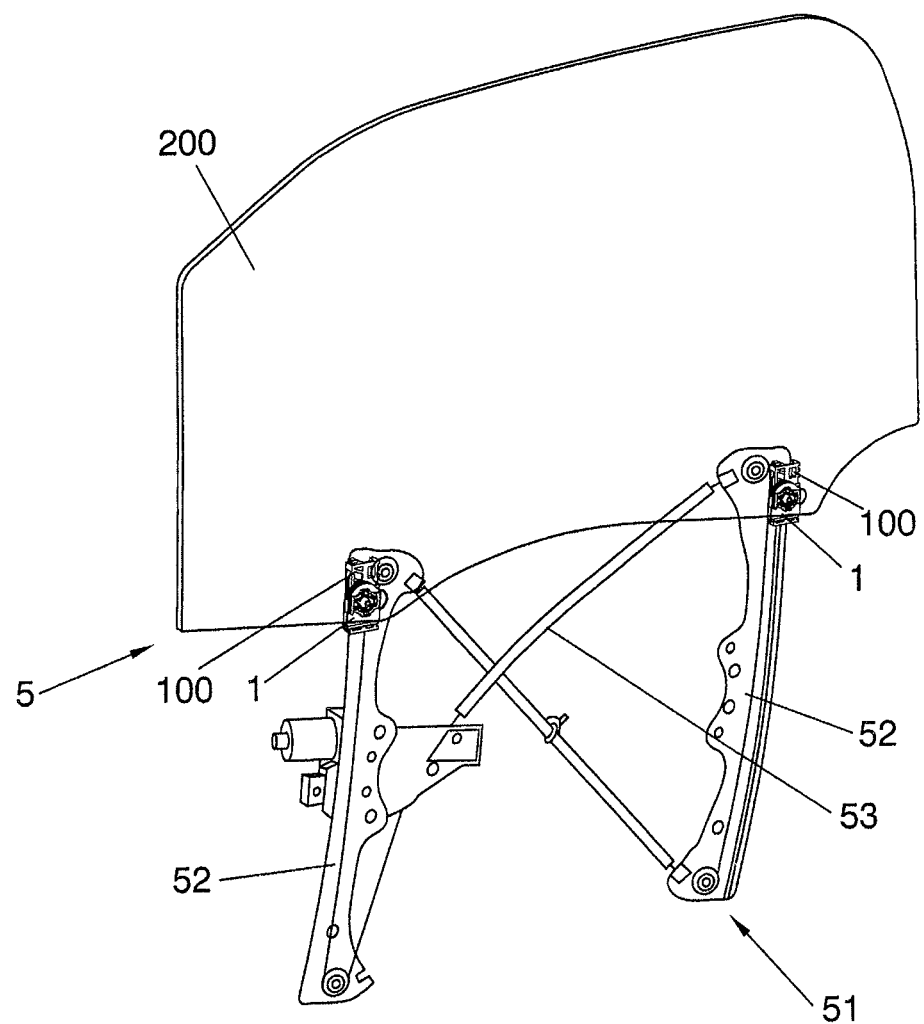
FIG. 6 illustrates a double rail window regulator with two attachment devices configured for absorbing manufacturing and assembly tolerances.

FIG. 6 is a schematic view of a window regulator assembly (5) with two rails (52) in which a glass pane (200) is mounted with attachment devices (1) connected to the carriers (100). The driving means (53) of the carriers have been schematically depicted.

Figure 7:
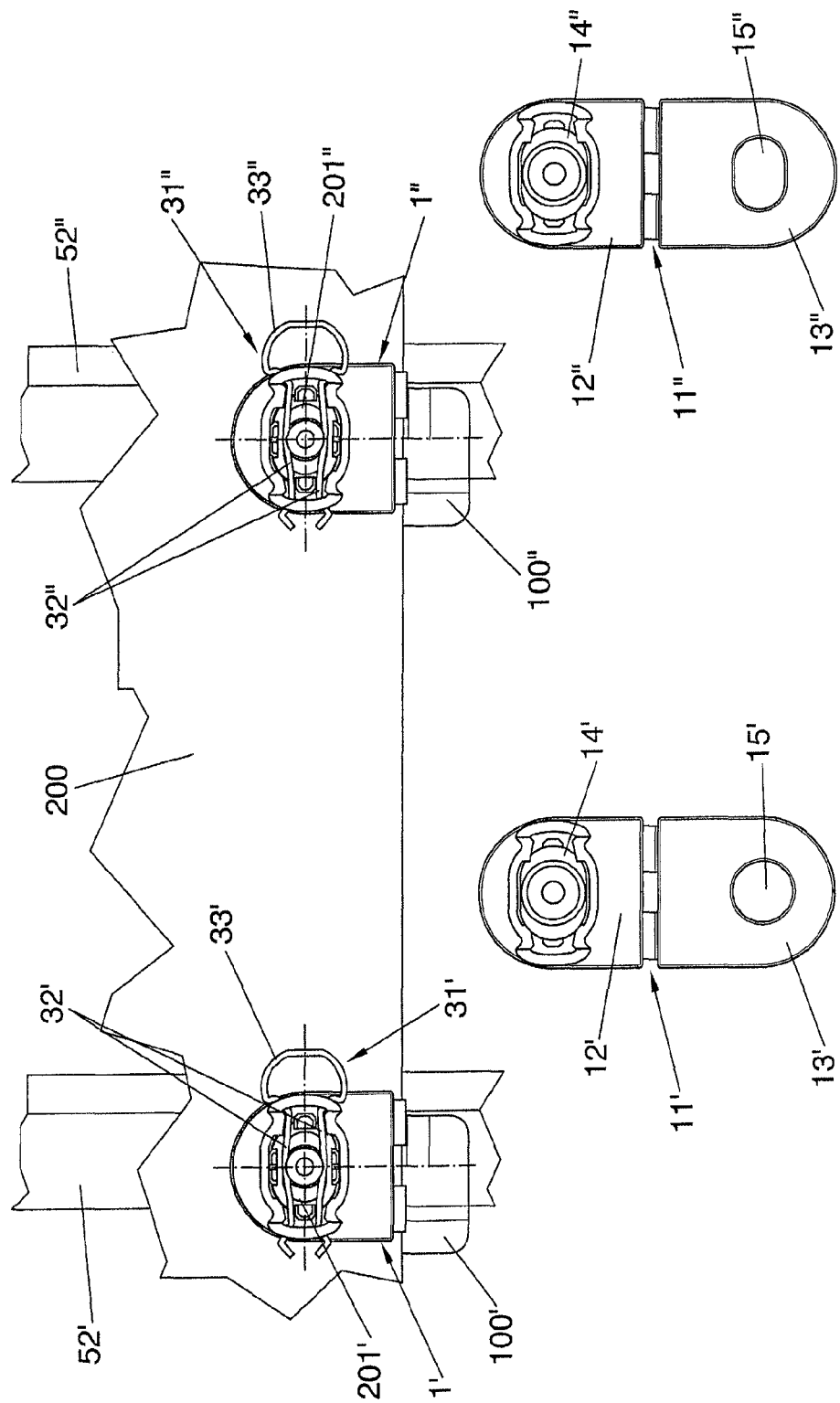
FIG. 7 schematically shows a window regulator assembly according to a possible embodiment of the invention.

FIG. 7 schematically illustrates a partial view of a window regulator according to a possible embodiment of the invention. This window regulator comprises two rails (52'), (52"). In the embodiment of the invention according to FIG. 6, in the rails (52'), (52") respective carriers (100'), (100") are mounted.

The glass pane (200) is mounted in the carriers (100'), (100") by means of respective attachment devices (1'), (1") in accordance with the invention, coupled in respective corresponding holes (201'), (201") of the glass pane (200). The attachment devices comprise holders (11'), (11") with their respective first part (12'), (12"), second part (13'), (13"), first hole (14'), (14"), and second hole (15'), (15"), as well as flexible retainers (31'), (31") with their legs (32'), (32") attached at a first end (33'), (33").

The difference between the two attachment devices (1'), (1") in the embodiment shown in FIG. 7 is the first hole (14'), (14"): in one of the attachment devices (1'), the first hole (14') is circular such that when said attachment device (1') is coupled with the coupling part (101') of the carrier (100') of the window regulator, the diameter of said first hole (14') corresponds with the outer diameter of the portion of the coupling part (101') contacting it. In contrast, in the other attachment device (1"), both the first hole (14") and the second hole (15") have a minimum diameter and a maximum diameter, such that when the attachment device (1") is coupled with the coupling part (101") of the carrier (100") of the window regulator, said minimum diameter matches the outer diameter of the portion of the coupling part (101") contacting it, allowing certain relative sliding between the carrier (100") and the attachment device (1") in the direction of the maximum diameter.

This is particularly advantageous in a window regulator with two rails (52'), (52"), such as the one shown in FIG. 7. A common problem is that the rails (52'), (52") guiding and defining the paths of their corresponding carriers cannot be perfectly parallel throughout their entire course primarily due to manufacturing and assembly tolerances both of the door and the rails (52'), (52"). However, the glass pane (200) is a completely rigid element, so once the attachment devices (1'), (1") are mounted in the glass pane (200), the distance between these attachment devices (1'), (1") is fixed and said rigidity of the glass pane (200) does not allow absorbing the minor variations suffered by the distance between the carriers (52'), (52") during movement when the window regulator is working. To that end the use of elongated holes (14"), (15") as illustrated in FIG. 7 can be advantageous because it allows small courses of the coupling part of the carrier (100") in a substantially horizontal direction along the hole (14") such that this course allows absorbing minor lacks of parallelism between the two rails, i.e., between the paths of the two carriers (100'), (100") when operating the glass pane (200) in an up or down direction, thereby preventing excessive stress, wear and even breaks resulting from said lack of parallelism.

To achieve the required tolerances it is not necessary for the two attachment devices to have this elongated hole, but it is sufficient if one of them has this type of elongated hole. It is not necessary that when one of the holes is circular like the attachment part, the other one must be circular as well. Likewise, when one of the holes has a maximum diameter and a minimum diameter, it is not necessary for the other one to be equal and it would be sufficient that their dimensions allow the mentioned relative movement along the maximum diameter. To that end, for a two rail window regulator system like that seen in FIGS. 6 and 7, it would be sufficient for one of the holes to prevent relative movement along the maximum diameter and the other one to allow relative movement along the maximum diameter.

As can be seen in FIGS. 2B-2D, to mount the attachment device (1) in the glass pane (200) it is sufficient to couple the second part (13) on a face of the glass pane (200) such that the coupling means (16) traverse a hole (201) in the glass pane, as seen in FIG. 2C, to then pivot the first part (12) upwards about the hinge (17) until it is retained by the coupling means (16), see FIG. 2D. When assembling the holder (11) to the glass pane (200), a noise preventing part (40) has been mounted between the holder (11) and the surface of the glass pane (200). Advantageously, the flexible retainer (31) can optionally be mounted in the holder (11), the attachment device (1) being ready for being subsequently mounted in the corresponding hole (201) of the glass pane (200).

As can be seen in FIGS. 5A-5D, to disassemble the attachment device (1) it is sufficient to move the flexible retainer (31) according to a direction transverse to the axis of the hole (201) of the glass pane (200) from its retaining position in which it retains the coupling part (101) of the carrier (100) of the window regulator (51) until it reaches its releasing position in which it no longer retains said coupling part (101) and then separating the glass pane assembly (2) from the carrier (100) of the window regulator (51) completely removing and releasing the coupling part (101) from the hole (201) of the glass pane (200).

In this text, the word "comprises" and its variants such as "comprising", etc., must not be interpreted in an excluding manner, i.e., they do not exclude the possibility that what is described can include other elements, steps etc.

On the other hand, the invention is not limited to the specific embodiments that have been described but also comprises, for example, the variants which can be carried out by the person having ordinary skills in the art, for example, in terms of the selection of materials, dimensions, components, configuration, etc., within the scope of the claims.

The invention claimed is:

1. Attachment device (1) for attaching a glass pane (200) of a vehicle to a carrier (100) of a window regulator (51) of a vehicle, the attachment device (1) comprising:

a holder (11) mounted in a hole (201) of the glass pane (200) for allowing attachment of the glass pane (200) to the carrier (100) of the window regulator (51), the holder (11) comprising a first part (12) on a face of the glass pane (200) and a second part (13) on another face of the glass pane (200), the first part (12) having a first hole (14) and the second part (13) having a second hole (15), the first part (12) and said second part (13) attached to one another by at least one hinge (17) so that the first part (12) can pivot with respect to the second part (13), and when the holder (11) is mounted on the glass pane the first part (12) and the second part (13) face one another with the glass pane (200) located between them, and the first hole (14), second hole (15) and hole (201) of the glass pane (200) being in correspondence with one another, the holder (11) having a coupler (16) for coupling and retaining the first part (12) and the second part (13); and a flexible retainer (31), coupleable to the holder (11) in correspondence with the first hole (14), so that the retainer (31) can adopt an assembly state when it is subjected to the pressure exerted by a coupling part (101) of the carrier (100) of the window regulator (51) when the coupling part (101) is inserted through the first hole (14), second hole (15) and hole (201) of the glass pane (200) in a direction perpendicular to the face of the glass pane and the retainer (31) can adopt a retaining state for retaining the coupling part (101) when pressure is reduced once the retainer (31) has reached a retaining part (102) of the coupling part (101).

2. The attachment device (1) of claim 1, wherein the retainer (31) comprises two legs (32) attached to one another at a first end (33) of the retainer (31), to allow certain elastic deformation so that a distance between the legs (32) can increase giving rise to the assembly state and retaining state, in accordance with the position of the coupling part (101) with reference to the retainer (31) and the pressure exerted by the coupling part during the process of assembling the glass pane (200) in the carrier (100) of the window regulator (51).

3. The attachment device (1) of claim 1 wherein the retainer (31) is formed of an elastic wire, preferably a metal wire.

4. The attachment device (1) of claim 1 wherein the second part (12) of the holder (11) has guiding elements (20, 21) for guiding the retainer (31) between a retaining position, in which it can retain the coupling part (101) of the carrier (100) of the window regulator (51), and a releasing position, which allows removing the coupling part (101) from the attachment device (1), and thus releasing the glass pane (200) with respect to the window regulator (51) by means of linear movement of the retainer (31) in a direction transverse to the axis of the hole (201) of the glass pane (200).

5. The attachment device (1) according to claim 4, wherein at least some of the guiding elements (20, 21) prevent movement of the retainer (31) in a direction parallel to the axis of the hole (201) of the glass pane (200).

6. The attachment device (1) of claim 4, wherein the holder (11) and the retainer (31) are configured such that when the first part (12) and the second part (13) of the holder (11) are coupled to one another through the coupler (16), the retainer (31) is retained in said holder (11), being movable between its retaining position and its releasing position.

7. The attachment device (1) of claim 6, wherein the guiding elements (20, 21) and the coupler (16) interact so that when the coupler (16) retains the first part (12) with respect to the second part (13), the retainer (31) is retained in the holder (11), being movable between its retaining position and its releasing position, removal of the retainer (31) from the holder (11) being enabled by decoupling the first part (12) from the second part (13).

8. The attachment device (1) of claim 1 further comprising at least one noise preventing part (40) interposed either between the first part (12) of the holder (11) and the glass pane (200) or between the second part (13) of the holder (11) and the glass pane (200), when the attachment device (1) is mounted in the hole (201) of the glass pane (200).

9. The attachment device (1) of claim 1 wherein at least one of the first hole (14) and second hole (15) is circular, and when the attachment device (1) is coupled with the coupling part of the carrier (100) of the window regulator, the diameter of the circular hole corresponds with the outer diameter of a portion of the coupling part.

10. The attachment device (1) of claim 1 wherein at least one of the first hole (14) and the second hole (15) has a minimum diameter and a maximum diameter, so that when the holder is coupled with the coupling part of the carrier (100) of the window regulator the minimum diameter of the at least one first or second holes matches an outer diameter of the portion of a coupling part.

11. A glass pane assembly (2) of a vehicle comprising:
the glass pane (200) with the hole (201) for attaching the glass pane (200) to the carrier (100) of the window regulator (51) of the vehicle; and
the attachment device (1) according to claim 1 wherein the holder (11) of the attachment device (1) is mounted in the hole (201) of the glass pane (200) with the first part (12) arranged on the face of the glass pane (200), and the second part (13) on another face of the glass pane (200), the first part (12) and second part (13) being coupled to one another so that the first hole (14), the second hole (15), the glass pane hole (201) and the retainer (31) are in correspondence with one another.

12. A window regulator assembly (5) comprising:
the glass pane (200); and
the attachment device (1) according to claim 1 mounted in the hole (201) of the glass pane (200) and the window regulator (51) all coupled to one another, the window regulator having a rail (52) of the carrier (100), driving means (53) for moving the carrier (100) along the rail (52), and the glass pane (200), the glass pane (200) being coupled to the carrier (100) of the window regulator (51) by means of collaboration between the attachment device (1) and the coupling part (101) of the carrier (100) of the window regulator (51), so that the retainer (31) is in the retaining position and in its retaining state and coupled to the retaining part (102) of the coupling part (101).

13. The window regulator assembly (5) of claim 12, wherein the coupling part (101) of the carrier (100) has an end (103) with bevelled surfaces to provide passage of the retainer (31) to its assembly state, and the retaining part (102) comprises at least one groove.

14. The window regulator assembly (5) of claim 12 wherein the window regulator (51) comprises two rails (52', 52") with two carriers (100', 100"), one for each rail (52', 52"), each carrier mounted in corresponding holes (201', 201") of the glass pane (200) by one of two attachment devices (1', 1"), so that one of the attachment devices (1') is circular with a diameter equal to an outer diameter of the coupling part (101) of the corresponding carrier (100) coupled therewith, whereas the other attachment device (1") has a minimum diameter and a maximum diameter, the minimum diameter being equal to an outer diameter of the corresponding coupling part (101).

15. A process of assembling the glass pane (200) in the carrier (100) of a window regulator assembly (5) according to claim 12 comprising the steps of:
coupling the retainer (31) in the holder (11) to configure the attachment device (1);
coupling the first part (12) and the second (13) of the holder (11) in the hole (201) of the glass pane (200) so that the first part (13) and the second part (13) are retained together with the glass pane (200) located between them, and the retainer (31) in a retaining position to configure a glass pane assembly (2);
attaching the glass pane assembly (2) to the carrier (100) of the window regulator (51) so that the coupling part (101) of the carrier (100) is introduced through the first hole (14) the second hole (15) and the hole (201) of the glass pane (200), pressing the retainer (31) until it reaches its assembly state; and
continuing to attach the glass pane assembly (2) to the carrier (100) of the window regulator (51) until the retainer (31) reaches the retaining part (102) of the coupling part (101) so the retainer (31) reaches its retaining state in which the glass pane (200) is eventually coupled to the carrier (100) of the window regulator (51).

16. A process of disassembling the glass pane (200) in the carrier (100) of the window regulator (51) of the vehicle to which it is coupled by means of at least one attachment device (1) according to claim 12 so that the coupling part (101) of the carrier (100) is retained by the retainer (31) of the attachment device (1) comprising the steps of:

- moving the retainer (31) in a direction transverse to the axis of the hole (201) of the glass pane (200), from a retaining position, in which it retains the coupling part (101) of the carrier (100) of the window regulator (51), until it reaches a releasing position, in which it no longer retains said coupling part (101);
- separating a glass pane assembly (2) from the carrier (100) of the window regulator (51); and
- completely removing and releasing the coupling part (101) from the hole (201) of the glass pane (200).

* * * * *